(12) United States Patent
Pulnikov

(10) Patent No.: US 8,769,797 B2  
(45) Date of Patent: Jul. 8, 2014

(54) METHOD FOR MOUNTING A BUSH AROUND A PART OF A SHAFT BY MEANS OF A TIGHT FITTING

(75) Inventor: Aleksandr Pulnikov, Antwerpen-Wilrijk (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 381 days.

(21) Appl. No.: 12/996,793

(22) PCT Filed: Jun. 9, 2009

(86) PCT No.: PCT/BE2009/000030
§ 371 (c)(1),
(2), (4) Date: Dec. 8, 2010

(87) PCT Pub. No.: WO2009/149524
PCT Pub. Date: Dec. 17, 2009

(65) Prior Publication Data
US 2011/0099793 A1  May 5, 2011

(30) Foreign Application Priority Data
Jun. 13, 2008 (BE) .................. 2008/0329

(51) Int. Cl.
*B23P 19/02* (2006.01)
*B23Q 3/00* (2006.01)
*H02K 15/02* (2006.01)
*H02K 21/12* (2006.01)

(52) U.S. Cl.
USPC .................. 29/525; 29/464; 29/598; 29/732; 310/156.01

(58) Field of Classification Search
USPC ........... 29/235, 282, 450, 525, 464, 596, 598, 29/732, 735, 898.07, 898.09; 310/156, 42, 310/260, 271
See application file for complete search history.

(56) References Cited

U.S. PATENT DOCUMENTS

| | | | |
|---|---|---|---|
| 3,947,944 A | | 4/1976 | Washington |
| 4,433,473 A | * | 2/1984 | Benedetti ................. 29/598 |
| 4,549,341 A | | 10/1985 | Kasabian |
| 4,918,802 A | * | 4/1990 | Schaefer ................. 29/598 |
| 5,188,478 A | | 2/1993 | Bitsch et al. |

(Continued)

FOREIGN PATENT DOCUMENTS

| CN | 1831347 A | 9/2006 |
|---|---|---|
| CN | 2901671 Y | 5/2007 |

(Continued)

OTHER PUBLICATIONS

Translation document of German Patent No. DE-102007014192-A1.*

(Continued)

*Primary Examiner* — David Bryant
*Assistant Examiner* — Jun Yoo
(74) *Attorney, Agent, or Firm* — Bacon & Thomas, PLLC

(57) ABSTRACT

Method for mounting a bush round a part (2) of a shaft with a force fit, which method comprises the following steps: providing a guide element (7, 23) with an outer surface (8) which is at least partly conical; providing the guide element (7, 23) in the extension of the aforesaid part (2) of the shaft (1); pushing the bush (5) over the guide element (7, 23) on the part (2) of the shaft (1).

18 Claims, 9 Drawing Sheets

(56) References Cited

U.S. PATENT DOCUMENTS

| | | | |
|---|---|---|---|
| 5,402,025 A * | 3/1995 | Saito et al. | 310/156.27 |
| 5,563,463 A * | 10/1996 | Stark | 310/156.28 |
| 6,047,461 A * | 4/2000 | Miura et al. | 29/598 |
| 6,104,115 A | 8/2000 | Offringa et al. | |
| 6,309,156 B1 * | 10/2001 | Schneider | 411/353 |
| 6,963,151 B2 * | 11/2005 | Van Dine | 310/87 |
| 7,228,615 B2 * | 6/2007 | Nilson | 29/598 |
| 7,534,047 B2 | 5/2009 | Reed | |
| 8,310,123 B2 * | 11/2012 | Saban et al. | 310/156.28 |

FOREIGN PATENT DOCUMENTS

| | | | |
|---|---|---|---|
| DE | 10 2007 014 192 A1 | 6/2008 | |
| GB | 2 299 217 A | 9/1996 | |
| JP | 2001-169487 A | 6/2001 | |
| JP | 2002-326130 A | 11/2002 | |
| JP | 2003-300119 A | 10/2003 | |
| JP | 2005-341658 A | 12/2005 | |

OTHER PUBLICATIONS

Translation document of Japanese Patent Publication No. 2003-300119.*

International Search Report in PCT/BE2009/000030, Jan. 7, 2010.

Chinese Office Action for related application CN 200980121791.0, dated Oct. 14, 2013.

* cited by examiner

METHOD FOR MOUNTING A BUSH AROUND A PART OF A SHAFT BY MEANS OF A TIGHT FITTING

The present invention concerns a method for mounting a bush on a part of a shaft with a force fit.

Without limiting the invention thereto, the field of application of the invention may be for example mounting a bush round a rotor shaft with permanent magnets of an electric machine, or any application whatsoever whereby a bush must be fixed in a non-rotating manner on a part of a shaft and whereby the bush is subject to turning forces, as is for example typically the case with applications having high rotational speeds.

Methods for fixing an element on a cylindrical part of a shaft are already known.

In many cases, as described for example in U.S. Pat. No. 4,549,341, an element with an inner passage whose inner diameter is smaller than the outer diameter of the aforesaid part of the shaft is taken.

In order to be able to apply such a type of element over the cylindrical part of the shaft, these known methods make use of the principle that objects expand when being heated and shrink when being cooled.

By heating the element and cooling the aforesaid part of the shaft, the difference between the inner diameter of the element and the outer diameter of the shaft is hereby eliminated, such that the element can be pushed over the cylindrical part of the shaft, after which, as the element is cooled down and the shaft is heated again, a shrink fit can be obtained.

A first disadvantage of these known methods is that they can only be applied with materials having a sufficiently high thermal expansion coefficient.

Another disadvantage of this known method is that the element must be strongly heated to obtain a sufficient expansion, which may cause damage to the element or even to the shaft.

With elements in the shape of permanent magnets, said heating may change the magnetism of the magnets.

Also with elements made of a polymer or plastic, such a heating may be fatal, as a result of which the field of application of this known method is restricted.

Further, heating large elements in a consistent manner, for example metal rings or the like, is very expensive and not simple.

Moreover, there is a danger with said known method in that, when applying the heated element on the shaft, the element will cool down too fast and will get stuck on the shaft before it has been put in the right place, with all the ensuing consequences.

With other known methods for applying an element on a shaft, as known for example from U.S. Pat. No. 5,188,478 and U.S. Pat. No. 6,104,115, the part of the shaft is provided with a conical outer surface on which has been provided an element with a complementary conical passage.

A disadvantage of such conical embodiments is that they are expensive.

Even if the element is made of a fibre-reinforced composite, for example, it will be hard to produce large numbers due to the conical shape of the element.

For, when manufacturing for example a conical composite ring, the inner conicity of the ring will be obtained by winding a strip of composite around a conical mandrel which is restricted to the length of one ring because of the required conicity.

On the contrary, it is easy to cut a cylindrical composite ring from a much longer cylindrical tube, whereby such a cylindrical tube can be obtained by winding a strip of composite around a cylindrical mandrel whose length may be chosen at random.

As a result, it is intrinsically much easier to produce cylindrical rings than conical rings.

Therefore, the present invention aims to remedy one or several of the aforesaid and/or other disadvantages.

In particular, the invention aims to obtain a cost-effective method for mounting a bush on a part of a shaft with a force fit.

The aim hereby is to obtain a force fit between the bush and the shaft, without a complicated shape being required for the bush to this end, such as for example a conical surface, a conical passage or the like.

Another aim of the invention is to obtain a method which can be applied at room temperature and whereby the bush is made for example of a synthetic material, such as a fibre-reinforced composite, or of a metal or the like.

To this end, the present invention concerns a method for mounting a bush on a part of a shaft with a force fit, which method comprises the following steps:

providing a guide element in the extension of the aforesaid part of the shaft, whereby this guide element has an outer surface which is at least partly conical and whose largest diameter deviates maximally five percent from the outer diameter of the aforesaid part of the shaft and whereby the guide element is positioned such that the largest diameter of the conical part is directed to the aforesaid part of the shaft;

pushing the bush over the guide element on the side of the guide element with the smallest diameter and on the aforesaid part of the shaft;

moving a press axially towards the conical part during a first step in shifting the bush over the guide element, whereby this press is provided with a bearing face on which the entire end face of the bush can rest during the pressing; and, making use of a press element with an inner diameter which is equal to or larger than the outer diameter of the part of the shaft during another step in shifting the bush over the guide element.

An advantage of such a method according to the invention is that the bush must not be provided with a complex shape which is difficult to realise, such as for example a conical surface, in order to obtain a solid connection between the shaft and the bush.

Another advantage of a method according to the invention is that it can be applied at room temperature.

In this way, there is no risk of damaging the shaft or the bush by means of surface oxidation or the like resulting from heating in order to shrink-fit the bush on the shaft, as is the case with some known methods.

Moreover, with such a method according to the invention, whereby no heating is required, the bush can be made of a composite, for example a glass fibre-reinforced composite, whereby the fibres preferably extend in all directions in relation to one another.

Another advantage of such a method according to the invention is that bushes having a longer length can be clamped on a shaft than is possible with the known methods.

Indeed, by making the press rest with a bearing face on the entire end face of the bush during the pressing in a first step to push the bush over the guide element, the risk that the bush will bend under the pressure force is strongly reduced.

Moreover, the axial strength of the bush is maximally used.

As a result, a larger frictional force between the bush and the guide element or the shaft can be overcome while pushing than with the known methods.

Since this frictional force is proportional to the contact surface between the aforesaid parts and thus increases as the length of the bush increases, bushes with a larger length can consequently be pushed over a shaft or guide element with a method according to the invention.

This offers the additional advantage that much time can be gained during the assembly.

Indeed, a method according to the invention requires less operations to clamp a bush with a relatively large length on the shaft than when a shaft with the same length must be provided with a bush by applying the known methods, whereby several bushes must be necessarily clamped one after the other on the shaft in this case.

Also, with a method according to the invention, the risk for other fail modes of the bush to occur while pressing is smaller, especially with bushes made of a composite.

By applying an inappropriate press method, the constituent parts of a composite bush might delaminate, for example, or cracks might occur for example in the outer composite layer or layers and the like.

Said risk is restricted to a minimum with a method according to the invention.

According to a preferred method of the invention, during the aforesaid first step to axially shift the bush over the guide element, the press is axially moved up to the conical part of the guide element.

Thus, the press will rest on the entire end face of the bush as long as this is possible during the first shifting step, which is of course advantageous to the stability of the bush while pressing.

According to a preferred method of the invention, the shaft is stepped and the guide element is at least partly hollow, whereby the guide element is centred on the shaft by providing it with its hollow part over a part of the shaft having a smaller diameter than the aforesaid part of the shaft over which the bush must be provided.

Such centring of the guide element on the shaft is very simple and practical.

According to an alternative method of the invention, the shaft is provided with a recess on its far end, and the guide element is provided with an axially protruding part which is complementary to the recess in the shaft, whereby the guide element is centred on the shaft by placing it at least partly in the recess of the shaft with its axially protruding part.

Such a method may be practical for example when the bush must be provided at the far end of the shaft or close to the far end of the shaft.

In order to better explain the characteristics of the invention, the following preferred embodiments of a method according to the invention for mounting a bush on a part of a shaft with a force fit are described by way of example only without being limitative in any way, with reference to the accompanying drawings, whereby FIGS. 1 to 10 included illustrate the successive steps of the method seen as a section, and in which.

Figure 12:
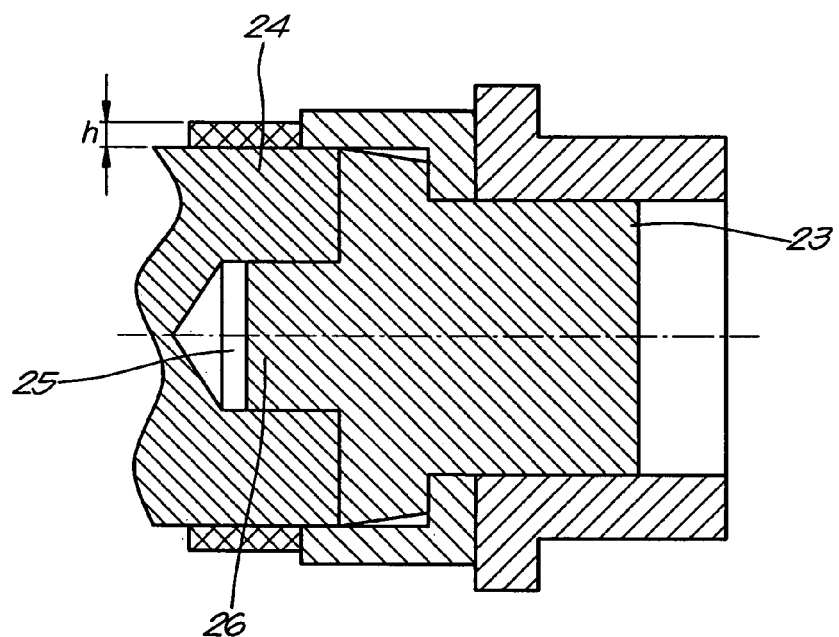

FIG. 12 shows an alternative embodiment whereby the shaft is provided with a cavity on its far end in which the guide element is introduced in a fitting manner; and, FIGS. 13 to 17 included illustrate frequently occurring failure modes when applying the known methods for mounting a composite bush on a part of a shaft with a force fit, which are avoided with a method according to the invention or at least occur less frequently.

The invention concerns a method for mounting a bush on a part of a shaft with a force fit.

Figure 1:
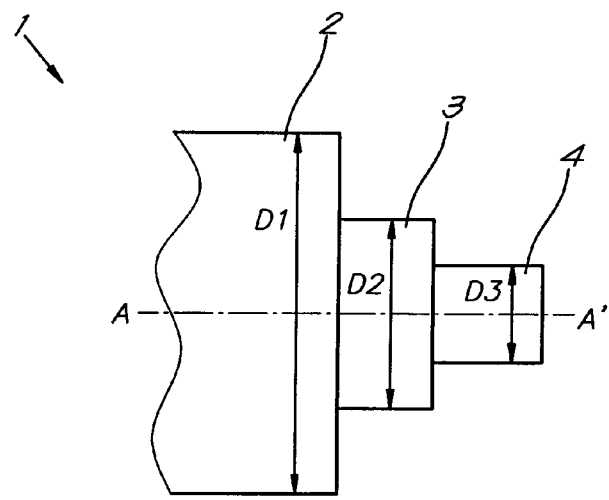
FIG. 1 is a side view of a part of a stepped shaft.

FIG. 1 represents a section of one far end of a stepped cylindrical shaft 1, with in this case at least three cylindrical parts 2, 3 and 4 of the shaft 1, summed up here according to a decreasing shaft thickness, whereby every part 2 to 4 of the shaft 1 has its own diameter, being the respective diameters D1, D2 and D3 from large to small.

Such a shaft 1 is merely an example of a shaft to which the method according to the invention relates and it could be for example a rotor shaft of an electric generator, whereby permanent magnets are provided in the rotor shaft and whereby over the shaft 1 must be provided a bush to protect the magnets for example.

In another application, the shaft 1 could be for example the shaft of a combustion engine, around which is provided a flywheel to make the motor shaft run more steadily.

Of course, many other applications are not excluded either.

In what follows, for simplicity's sake, it is assumed, however, that the bush 5, represented in FIGS. 3 to 12 included, must be provided with a force fit on the cylindrical part 2 of the shaft 1.

The bush 5 has a cylindrical passage 6 with an inner diameter D4 which is smaller than the outer diameter D1 of the part 2 of the shaft 1 on which the bush 5 must be fixed.

The method according to the invention comprises the step of providing a guide element 7 with an outer surface 8 which is at least partly conical.

On the one hand, the largest outer diameter D5 of the conical part 9 of the guide element 7 hereby deviates maximally five percent from the outer diameter D1 of the part 2 of a shaft 1 on which the bush 5 must be fixed.

On the other hand, the smallest outer diameter D6 of the conical part 9 is in this case smaller than, or possibly in other cases, maximally equal to the inner diameter of the bush 5.

Preferably, at least the guide element 7 of the bush 5 is provided with a rounding on the edge of the contact surface between both, whereby the radius of the aforesaid rounding is preferably situated within a range of $10^{-10}$ times the smallest diameter D6 of the conical part 9 to $10^{-1}$ times the smallest diameter D6 of the conical part 9. The edges referred to are respectively represented in FIG. 3 by the references R and R'.

In the example discussed here, the outer surface 8 of the guide element 7 is also provided, on the side 10 of the conical part 9 with the smallest diameter D6, with a cylindrical part 11 which connects to the conical part 9 via a collar transition.

The outer diameter D7 of said cylindrical part 11 is in this case smaller than the smallest diameter D6 of the conical part 9.

According to the invention, said diameter D7 may in other cases be maximally equal to the diameter D6, in which latter case the cylindrical part 11 is connected directly to the conical part 9 without any collar transition.

Further, in the example of FIGS. 1 to 11 included as discussed here, the guide element 7 is made at least partly hollow.

More specifically, the guide element 7 is in this case provided with a central passage 12 with an inner diameter D8 which corresponds to the diameter D2 of the shaft part 3 adjacent to the part 2 of the shaft 1 on which the bush 5 must be fixed.

Figure 2:
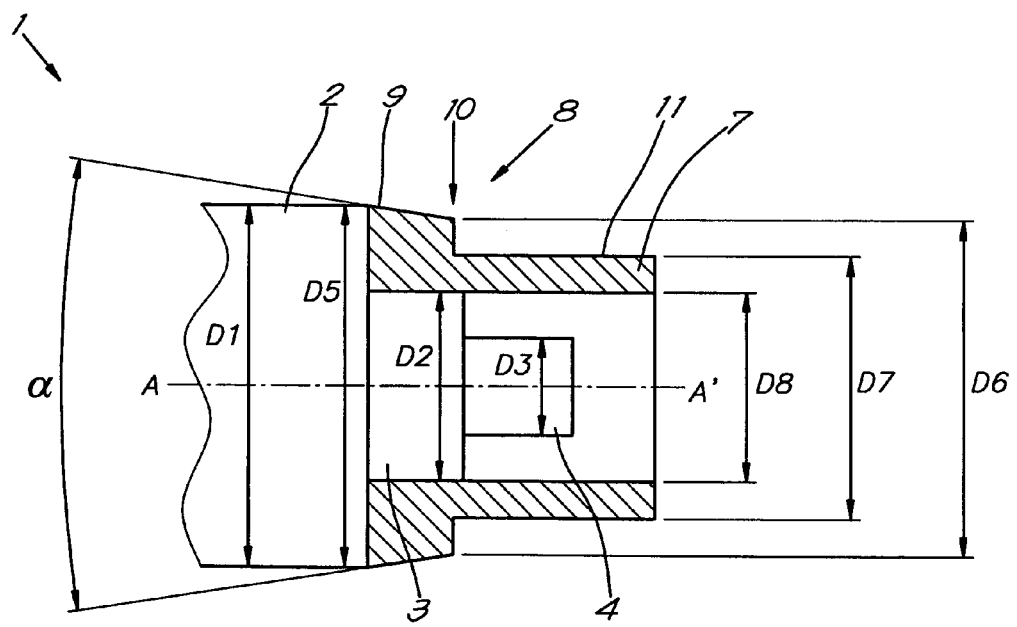
FIG. 2 shows how a guide element is provided over the stepped shaft according to FIG. 1.

Consequently, the guide element 7 can be centred on the shaft 1, such as is illustrated for example in FIG. 2, by providing it with its hollow part or its passage 12 over the part 3 of the shaft 1 having a smaller diameter D2 than the part 2 of the shaft 1 over which the bush 5 must be provided.

According to a method of the invention, the aim hereby is to place the guide element 7, more particularly the conical part 9 of the guide element 7, in the extension of the part 2 of the shaft 1, whereby more specifically the conical part 9 of the guide element 7 with the largest outer diameter D5 is directed to the part 2 of the shaft 1.

Figure 3:
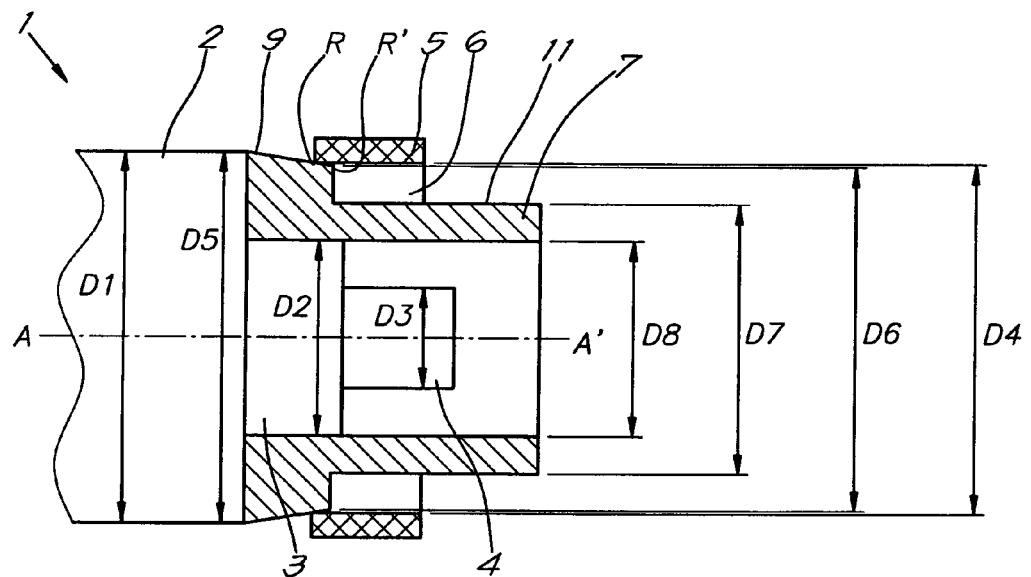
FIG. 3 illustrates how a bush is provided over the guide element.

As is illustrated in FIG. 3, the bush 5 with its passage 6 can be subsequently placed over the provided guide element 7 on the other side of said guide element 7.

Next, a force F is exerted on the bush 5 in the axial direction AA' and directed towards the part 2 of the shaft 1 so as to slide the bush 5 over the guide element 7 on the part 2 of the shaft 1. Finally, the guide element 7 is removed again in this case.

The axial force F can be exerted in many ways, whereby the method can comprise two or several steps, for example as a function of the thickness h of the wall of the bush 5 or as a function of the auxiliary means used when exerting the axial force F.

Figure 4:
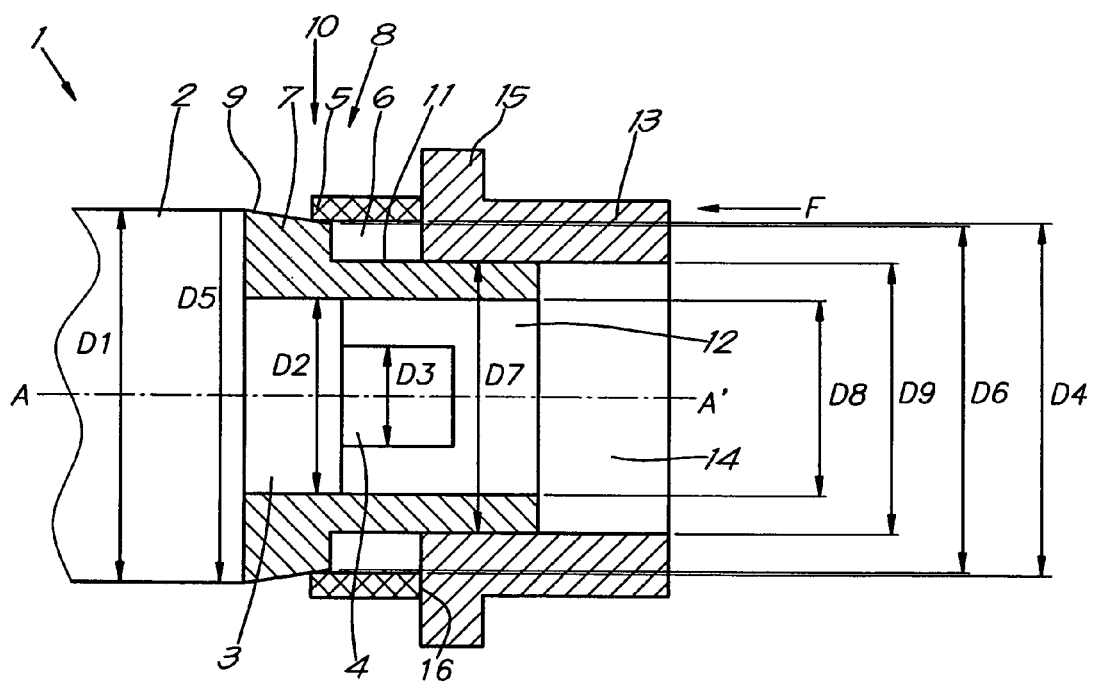
FIG. 4 shows how a press can be placed up against the bush.

A preferred way of exerting the axial force F on the bush 5 consists in using a cylindrical press 13 which is for example partly hollow or, as represented in the given example of FIG. 4, entirely hollow.

The press 13 is in this case more specifically provided with a central recess 14 having an inner diameter D9 which corresponds practically to the outer diameter D7 of the cylindrical part 11 of the guide element 7.

The aim of the method according to the invention hereby is to exert an axial force F on the bush 5 with the press 13, such that the bush 5 slides over the conical part 9 of the guide element 7, whereby the press 13 itself is moved over the cylindrical part 11 of the guide element 7 during said axial movement.

The hollow press 13 is provided with an overhang 15 which serves as a bearing face against which the entire end face 16 of the bush 5 can rest in a first step during the pressing.

This reduces the risk for the bush 5 to be upset or to buckle inward during the pressing.

Moreover, according to a method of the invention, during this first step to slide the bush 5 over the guide element 7, the cylindrical press 13 is preferably moved axially up to the conical part 9 of the guide element 7.

Figure 5:
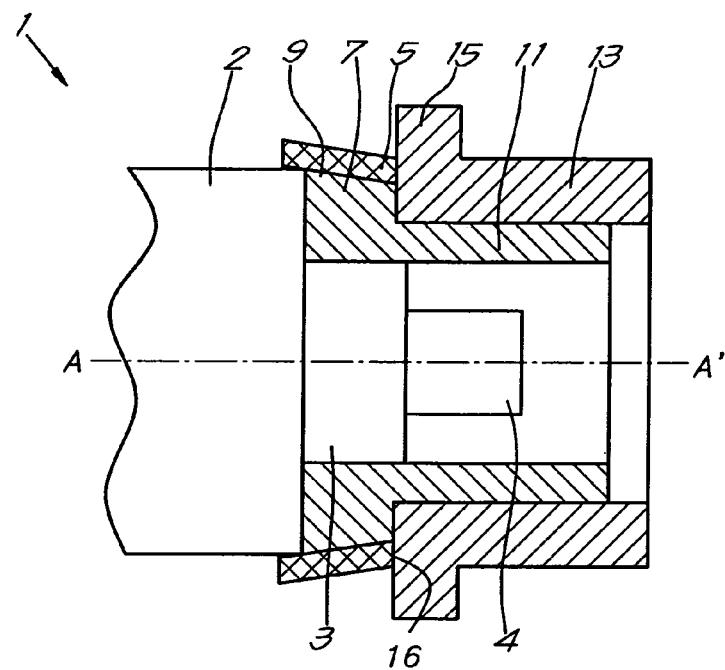
FIG. 5 shows the condition after the press has been moved axially up against the conical part of the guide element.

This is illustrated in FIG. 5.

In the given example, the press 13 cannot even be moved further to the part 2 of the shaft 1, since the diameter D9 of the recess 14 in the press corresponds over the entire length of the press 13 to the outer diameter D7 of the cylindrical part 11 of the guide element 7, whereby the difference between the diameters D6 and D7 moreover forms a sort of stop.

This can be avoided for example by providing a part of the recess 14 in the press 13 with a somewhat larger diameter.

However, as a consequence, the contact surface between the press 13 and the end face 16 of the bush 5 is reduced as well, which could contribute to the bush 5 being upset or being buckled inward.

In order to avoid this, an extra support may possibly be provided for while the bush 5 is being pressed over the conical part 11, for example by selecting equal or practically equal diameters D4, D6 and D7.

Figure 6:
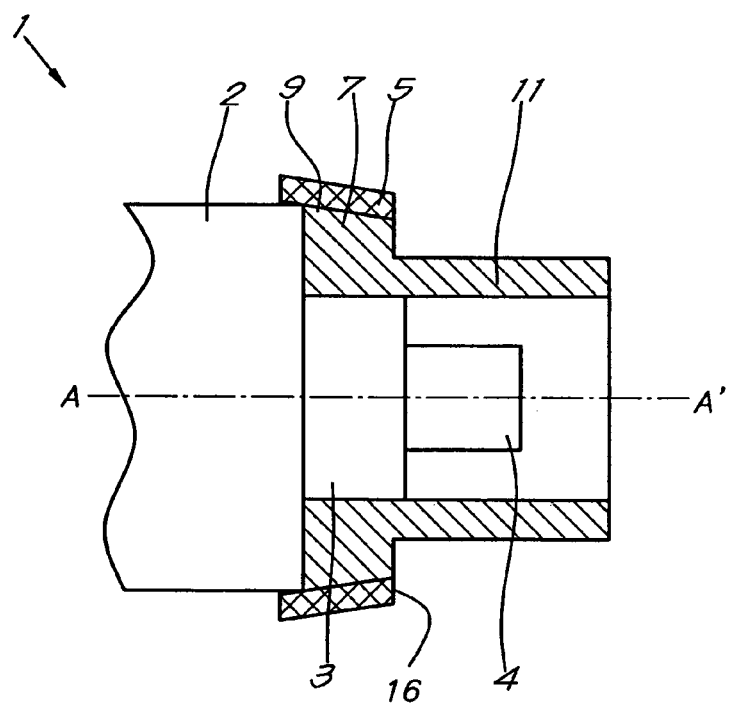
FIG. 6 shows the condition after the press has been removed.

After the removal of the press 13, a situation is obtained as is represented in FIG. 6.

In order to be able to slide the bush 5 even further over the conical part 9 of the guide element in the axial direction AA' towards the part 2 of the shaft 1, according to a special aspect of the invention, use is made of an additional accessory 17 in a following step of the method.

Figure 7:
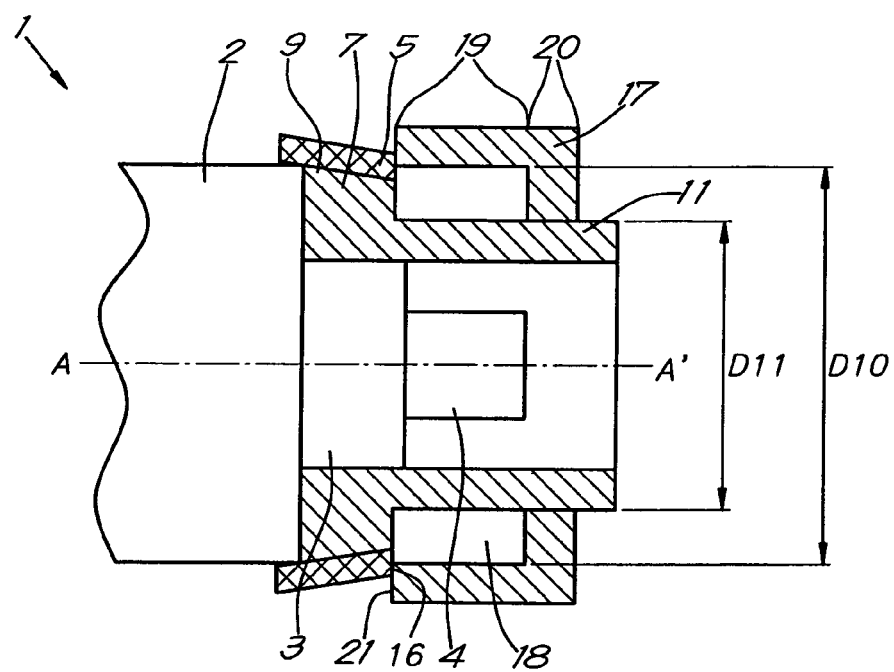
FIG. 7 illustrates how an additional accessory is placed against the bush.

As is represented in FIG. 7, such an accessory 17 may consist for example of a cylindrical press element 17 having a stepped recess 18.

In the given example, the recess 18 is realised with an inner diameter D10 for a part 19 which is larger than the inner diameter D4 of the bush 5 or than the smallest diameter D6 of the conical part 11 of the guide element 7.

More specifically, said diameter D10 of the aforesaid part is in this case equal to or somewhat larger than the outer diameter D1 of the part 2 of the shaft 1.

Further, the recess 18 of the adjacent part 20 of the accessory 17 has an inner diameter D11 which corresponds to the diameter of the cylindrical part 11 of the guide element 7.

As a result, it is possible to centre the accessory 17 with the recess 18 of the part 20 on the guide element 7, while the accessory 17 can rest against the bush 5 with its far end 21 at the part 19, and the bush 5 can slide partly or entirely over the conical part 9 of the guide element in the axial direction AA', when an axial force F is being exerted on the accessory 17.

Figure 8:
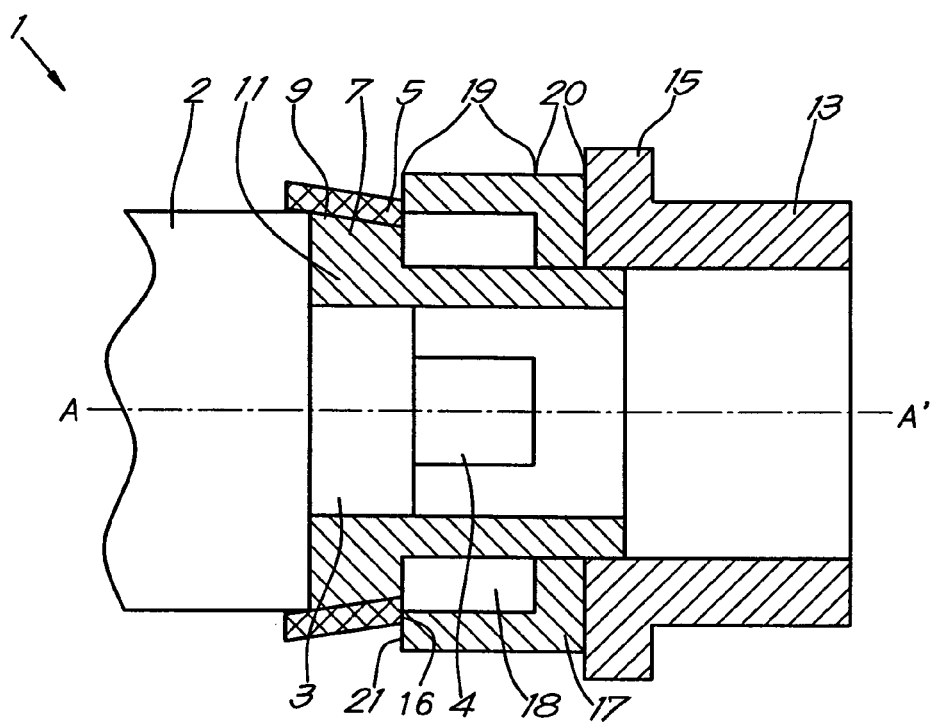
FIG. 8 shows how the press can be applied up against the additional accessory again.

As shown by means of FIG. 8, such an axial force F can be exerted on the accessory 17 by means of the press 13 after it has been provided in a centred manner on the guide element 7 again by pushing the press 13 over the cylindrical part 11 of said guide element 7 again until it rests with its overhang 15 up against the accessory 17.

Figure 9:
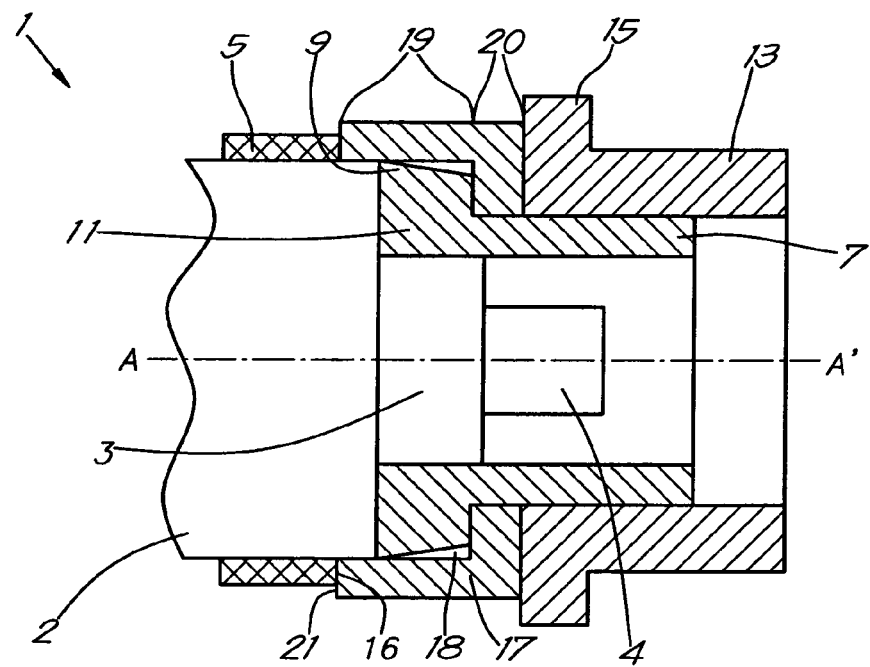
FIG. 9 shows a condition whereby the bush has been moved axially up to a part of a shaft by means of the additional accessory and the press.

As shown in FIG. 9, when exerting an axial force F on the accessory 17, the bush 5 can shift over the conical part 9 of the guide element 7, whereby, in the given example, the maximal length over which sliding in the axial direction is possible in this step, is determined by the length of the part 19 of the accessory 17 with the wider passage D10.

It should be noted that the diameter D10 in this case is also sufficiently large to press the bush 5 up to the part 2 of the shaft 1.

Figure 10:
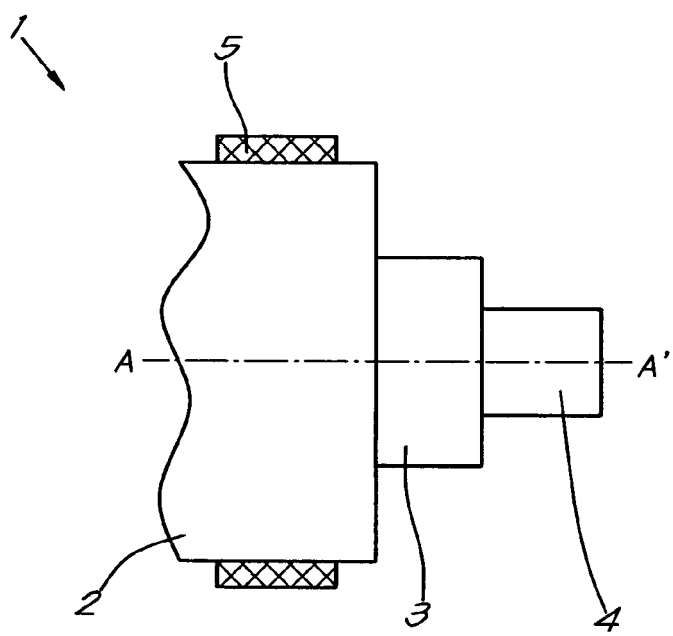
FIG. 10 shows the clamped joint that is eventually obtained between the bush and the part of a shaft.

After removal of the press 13, the accessory 17 and the guide element 7, the situation as represented in FIG. 10 is obtained, whereby a bush 5 is mounted on the part 2 of the shaft 1 with a force fit, without the thermal expansion qualities of the used material having been used during the mounting to that end.

Sometimes, it may be useful to apply several analogous intermediate steps, whereby several successive alternative accessories 22 are applied when axially the bush 5 over the guide element 7, whereby in every subsequent step an alternative accessory 22 with an ever increasing inner diameter D10 is used.

Figure 11:
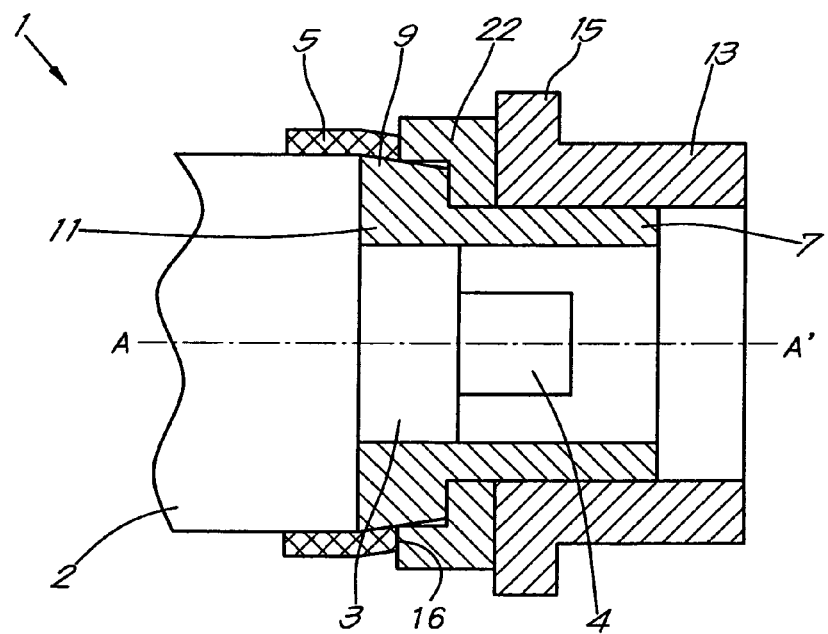
FIG. 11 shows an alternative embodiment analogous to FIG. 9 whereby yet another additional accessory is used as an intermediate step.

The use of such an accessory 22 is illustrated by means of FIG. 11.

It is clear that, when the thickness h of the wall of the bush 5 decreases and the difference between the inner diameter D4 of the bush 5 and the outer diameter D1 of the part 2 of the shaft 1 on which the bush 5 is to be fixed increases, several such intermediate steps will preferably have to be used.

Indeed, the last accessory 17 which is applied according to the method must always have an inner diameter D10 which is at least as large as the diameter D1 of the part 2 of the shaft 1.

If the bush 5 has a thin wall and the difference in diameter D1-D4 to span is large, such an accessory 17 or 22 will only rest on a very restricted part of the end face 16 of the bush 5 during the pressing, which might cause buckle problems or the like.

In extremis, if a bush 5 were to be used having a thickness h which, is smaller than the difference in diameter D1-D4 to span, it would be impossible to obtain any deformation of the bush 5 by means of a single accessory 17.

Such a case might occur in practice if a material were to be used which is very elastic in a radial direction, but relatively rigid in the axial direction.

Indeed, the required large radial expansion of the bush 5 requires a large elasticity of the bush 5, whereas when pressing according to a method of the invention, a non-negligible axial force F must be exerted on the bush 5.

Such a material could be for example a fibre-reinforced composite whose fibres are directed such that a good radial elasticity and a large axial strength are obtained. A large radial elasticity is actually a quality of modern composites.

For that matter, one of the merits of the present invention is that it makes it possible to shift a thin-walled bush 5 having a thickness h and an original inner diameter D4 over the shaft 1 with an outer diameter D1, whereby the difference in diameter D1-D4 is larger than the thickness h of the bush 5.

This is not possible with the known techniques.

The following dissertation hereby illustrates what advantage this may offer.

For, the purpose is for the bush 5 to exert a certain radial pressure P on the shaft 1 after having been clamped on it so as to be able to resist the rotor forces.

This radial pressure P is represented by the following formula:

$$P = (h \cdot \sigma)/D4 = (h \cdot \epsilon \cdot E)/D4$$

whereby
P is the pressure exerted on the shaft 1 by the bush 5;
h is the thickness of the bush 5;
D4 is the inner diameter of the bush 5;
E is the Young modulus of the material out of which the bush 5 is made;
$\sigma$ is the radial tension in the bush 5; and,
$\epsilon$ is the radial deformation of the bush 5.

It is clear that, in order to obtain the same radial pressure P on the shaft 1, one may opt for a bush 5 having a relatively large thickness h which is only subject to a small deformation $\epsilon$, as well as for a bush 5 having a relatively small thickness h which is subject to a larger deformation $\epsilon$.

The latter option is more economical in many cases, since one can save on the material of the bush 5 itself.

However, with the known methods whereby only one step is used during the pressing, only a limited deformation of the bush 5 can be obtained.

By applying a method according to the invention with two or several steps during the pressing, a much larger deformation of the bush 5 can be obtained, and thus a smaller thickness h of the bush 5 can be selected.

Moreover, it is known that in magnetic circuits whereby the magnetic field passes through an air gap, such as for example in the case of motors with permanent magnets, the air gap between rotor and stator is preferably restricted as much as possible so as to restrict the magnetic resistance or reluctance.

By applying a method according to the invention, it is possible for example to embed such permanent magnets in a rotor and to screen them with a bush 5 having a thickness h which can be selected much smaller than with the known methods, since a larger radial extension can be obtained with a method according to the invention.

As a result, also much less magnetic material will be required, which again implies a big cost saving.

Further, according to the invention, the apical angle $\alpha$ of the conical part 9 of the guide element 7 is preferably not too large, preferably between 0.01° and 15°, since with a small apical angle $\alpha$, by exerting an axial force F, the bush 5 can be deformed relatively more easily than with a larger angle $\alpha$.

Preferably even, this apical angle $\alpha$ is selected smaller than or equal to the value obtained according to the following formula:

$$\alpha = k \cdot |\epsilon| \cdot D4/(h \cdot (D1-D4))$$

whereby:
$\alpha$ = the maximal apical angle in °;
k = a factor which is selected on the basis of the way in which the bush 5 is composed and the material out of which the bush 5 is made, which factor is situated within a range of $10^{-6}$ to $10^{-2}$;
$|\epsilon|$ = the absolute value of the maximally possible elongation for the least elastic material component of the bush 5 or the plasticity limit of the metal, provided the bush is made of metal;
h = the thickness of the wall of the bush 5 in m;
D4 = the inner diameter of the bush 5 in m; and,
D1 = the outer diameter of the part 2 of the shaft 1 in m.

By taking into account this calculation method, the axial force F is kept within bounds, as a result of which certain manners of failure of the bush 5 during the pressing can be avoided, as will be further explained.

According to a non illustrated variant, use can be made of a guide element which comprises a number of successive conical parts over its longitudinal direction, whereby every conical part meets the aforesaid formula and whereby D1 is each time determined by the largest outer diameter of the conical part concerned.

Figure 15:
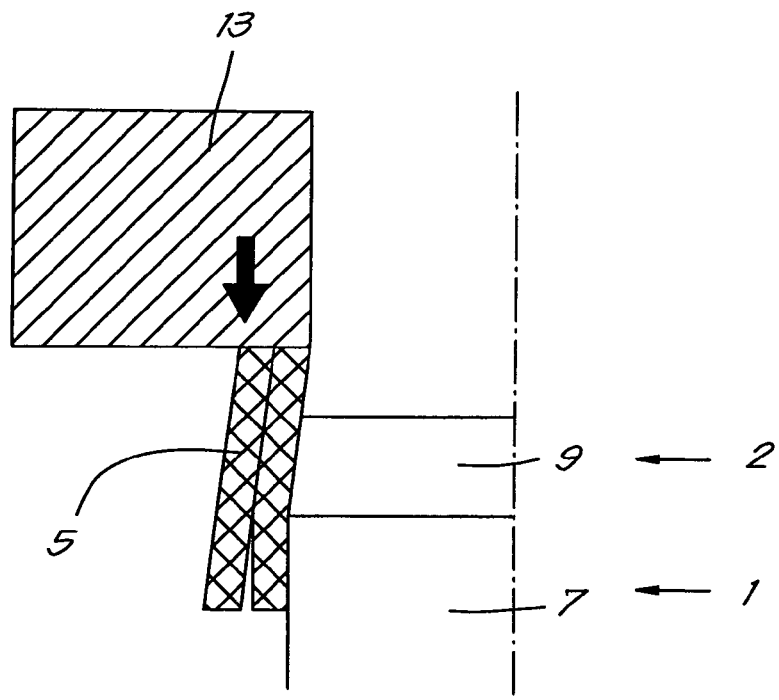
Figure 16:
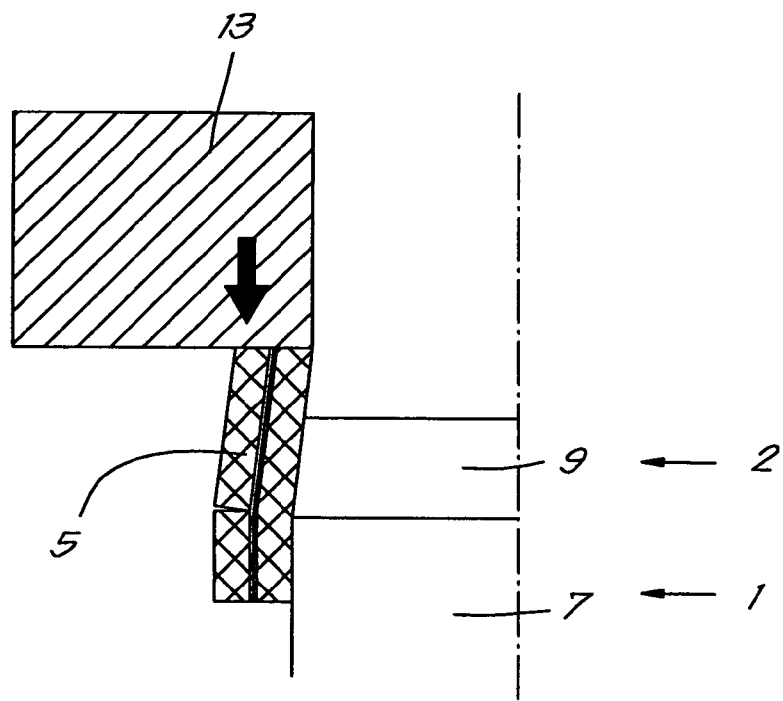

By selecting an apical angle $\alpha$ which is sufficiently small, problems can be avoided such as for example delamination of the layers (FIG. 15) out of which the bush 5 is made or cracking of the composite on the outside of the bush 5, as is illustrated by means of FIG. 16.

Moreover, the smaller the apical angle $\alpha$ is selected, the easier the deformation of the bush 5 over the conical part 9 of the guide element 7 can be obtained.

A k value which is practically equal to $10^{-4}$ is thought to be appropriate according to the invention, for example to avoid the aforesaid effects, whereby with this k value a wide range of materials used for the bush 5 and of manners to compose the bush 5 is covered.

Preferably, the bush 5 is made of a plastic, and most preferably even of a composite which is for example fibre-reinforced.

According to a special characteristic of the invention, the bush 5 is made of different layers of composite which are either or not fibre-reinforced, whereby the layers which are situated near the outer perimeter of the bush 5 have a larger elasticity than the layers which are situated near the inner wall of the above-mentioned bush 5.

Such a composite bush is preferably made of a fibre-reinforced composite with at least one of the following layers or a combination thereof:
- an inner layer whose fibres are wound in a direction extending between +/−70° and 90° in relation to the shaft of the bush (5);
- an intermediate layer whose fibres are wound in a direction extending according to a direction between +/−70° and 90° in relation to the shaft of the bush (5);
- an axial layer whose fibres are wound in a direction extending according to a direction between 0 and +/−70° in relation to the shaft of the bush (5); and,
- an outer layer whose fibres are wound according to a direction extending between +/−70° and 90° in relation to the shaft of the bush (5).

The different angles for the fibre directions can hereby be adjusted as a function of the required strength for the bush 5.

According to another preferred method of the invention, the aforesaid inner layer of such a composite bush 5 is made with carbon fibre.

The method according to the invention is very appropriate for clamping bushes 5 on a shaft 1, and especially for pressing composite bushes 5 on a shaft 1.

Indeed, with a method according to the invention, a number of failure modes are avoided which may occur when pressing bushes 5 over a cone 9, a number of failing manners of which will be discussed hereafter by means of FIGS. 13 to 17 included.

By first of all making use of a press 13 with a method according to the invention which rests on the entire end face 16 of the bush 5, or of an accessory 17 which rests on the entire end face 16 of the bush 5, the risk for the bush 5 to buckle is very much reduced or entirely eliminated.

Figure 13:
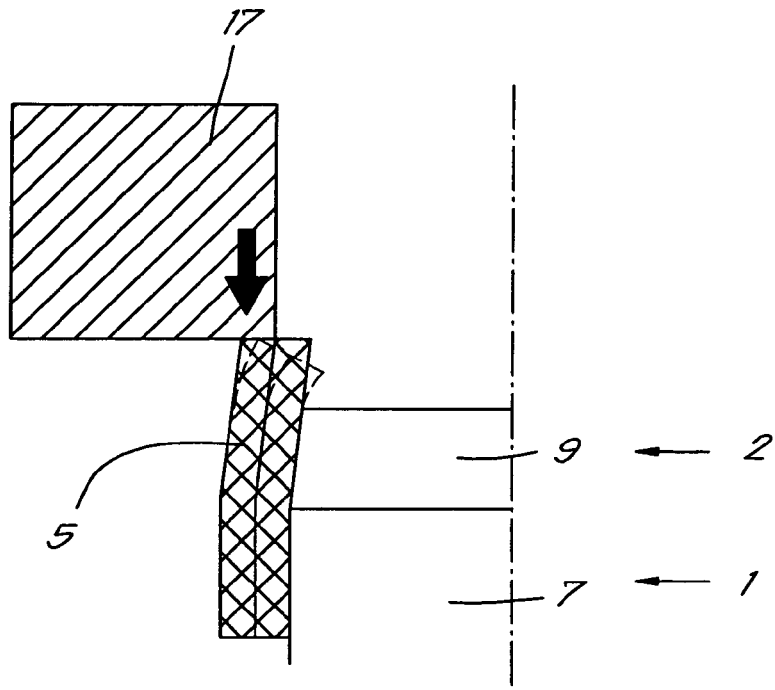

If this were not the case, the bush will easily buckle inward, as shown in FIG. 13, since during this first pressing phase, the far end of the bush 5 at the press 13 or at the accessory 17 is not internally supported.

Moreover, the asymmetrical force of the press 13 or the accessory 17 acting on the bush 5, as well as the orientation of the cone 9 further promote the buckling.

Another failing mode which may occur with bushes 5 made of several layers, such as for example made of a composite, consists in that the layers delaminate during the pressing.

Figure 14:
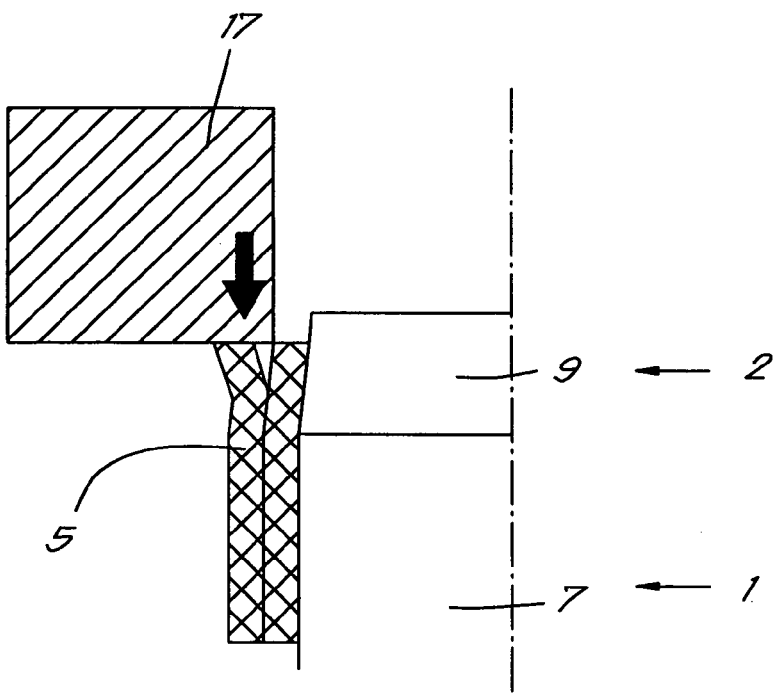

Such failure modes are illustrated by way of example in FIGS. 14 and 15, whereby the layers delaminate on the far end of the bush 5 near the press 13 or the accessory 17 and on the far end of the bush 5 which has already been pushed over the shaft part 2 respectively.

The reason why the layers of the bush 5 come off is mainly that a too large apical angle α is taken for the cone part 9 of the guide element 7.

FIG. 16 shows yet another failure mode of the bush 5 which may occur due to an inappropriate selection of the apical angle α for the cone part 9.

In particular, a too large apical angle α and a too small rounding between the cone part 9 and the shaft part 2 cause a change in direction in the bush 5 which is too abrupt, as a result of which cracks may occur on the surface of the bush 5.

However, by doing as described above and by selecting an appropriate apical angle α, as well as a good rounding between the cone part 9 of the guide element 7 and the shaft part 2, the risk for said bush 5 to delaminate or of cracks being formed on the surface of the bush 5 will be reduced to a minimum, if not eliminated, which again demonstrates the strength of a method according to the invention.

Moreover, according to an alternative method of the invention which has not been discussed yet, it is not excluded to provide the bush with a number of additional fibre-reinforced layers which merely serve as a reinforcement during the mounting of the bush 5 on the shaft 1, precisely to prevent the aforesaid delaminating or cracks being formed in the bush 5 or cracks being formed on the surface of the bush 5 during the mounting.

As already postulated above, the bush 5 can for example be built of an inner layer, an intermediate layer, an axial layer and an outer layer, whereby after the bush 5 has been mounted on the shaft 1, one or several of these layers can be removed again from the bush 5.

A major advantage of this method consists in that the layers of the bush 5 which are preserved after it has been mounted can be made with a larger fibre density then if such temporarily reinforcing layers were not applied.

In this way, the eventually mounted bush 5 may have a small thickness h, formed of one or several functional layers, but it can nevertheless exert a large radial pressure P on the shaft 1.

Figure 17:
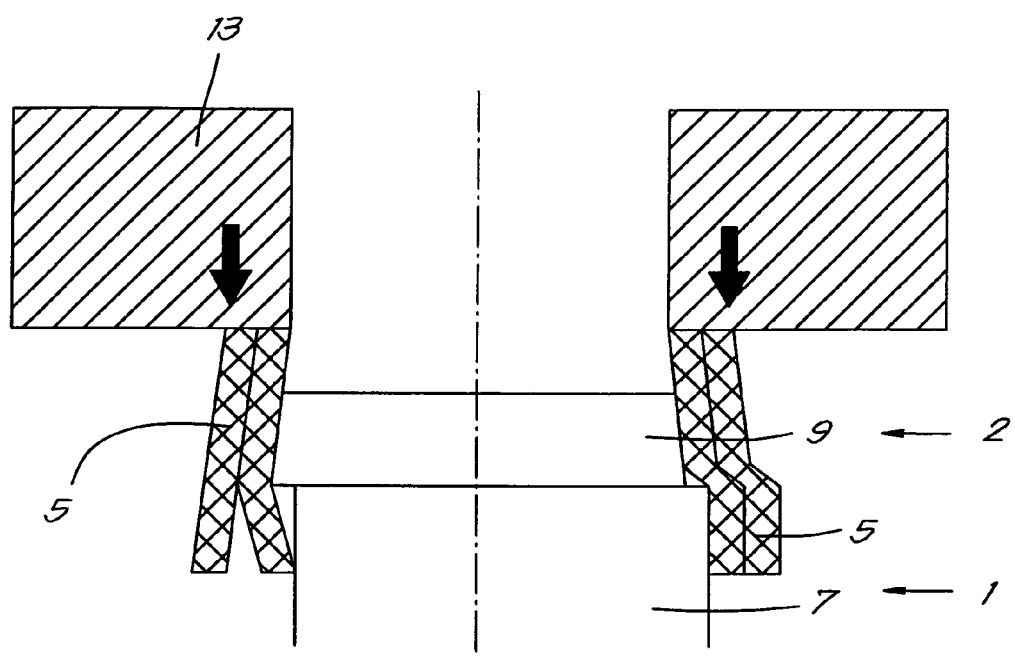

Another advantage of a method according to the invention is that the guide element 7, the shaft 1 and the press 13 can be very well aligned in a very simple manner, such that a failure mode, as shown in FIG. 17, can be avoided.

Due to a bad positioning of the guide element 7 in relation to the shaft part 2, there will be a certain delamination of the layers of the bush 5 and/or a buckle will be formed at the badly aligned transition between the conical part 9 and the shaft part 2.

By providing the guide element 7 with a central passage 12 having an inner diameter D8 which corresponds to the diameter D2 of the shaft part 3 adjacent to the part 2 of the shaft 1, as in the method according to the invention, a good alignment is automatically obtained, as a result of which a good alignment is self-evident and the aforesaid problems are avoided.

A good alternative for the composite bush 5 consists in making the bush 5 of a preferably thin metal.

A metal is hereby preferably selected with a yield point which is higher than the maximal tension occurring while the bush 5 is being mounted.

The invention is not restricted to the methods described up to now; on the contrary, other analogous methods are not excluded either.

For example, another type of guide element 23 can be centred on the shaft in another manner, as is illustrated by means of FIG. 12.

In the given example of FIG. 12, the shaft 1 is provided with an inner opening 25 on its far end 24, whereas the guide element 23 is provided with an axially protruding part 26 which is complementary to the inner opening 25 in the shaft 1.

In this way, it becomes possible to centre the guide element 23 on the shaft 1 by introducing it in the opening 25 of the shaft 1 with its axially protruding part 26.

This may be advantageous, for example, when a bush 5 must be fixed on a part 2 of the shaft 1 which is situated at or close to the far end 24 of the shaft 1.

According to yet another alternative method of the invention, it is not excluded even to make the shaft 1 such that the guide element 7 is an integral part of it, for example by providing the shaft 1 next to the part 2 of the shaft 1 with a conical part over which the bush 5 can be pushed so as to obtain a radial expansion of the bush 5.

Also other methods whereby for example a press 13 is used in which one or several telescopic accessories 17 and 22 are integrated are not excluded either.

Also centring the different parts in relation to one another, such as the guide element 7, the shaft 1, the accessories 17 and 22 and the press 13, can be done in different ways.

Although in the figures, the part 2 of the shaft 1 on which the bush 5 has to be mounted with a force fit is round/cylindrical, it is not excluded for the invention to be applied on a part 2 of the shaft 1 with an oval/cylindrical shape or a cylindrical shape with key ways or the like, or even on a part 2 of the shaft 1 with a conical shape.

The invention is by no means restricted to the methods and applications according to the invention described by way of example and represented in the accompanying drawings; on the contrary, such a method for mounting a bush on a part of a shaft with a force fit can be realised in many other ways or in other applications while still remaining within the scope of the invention.

The invention claimed is:

1. A method for mounting a bush around a part of a shaft with a force fit, comprising the steps:
   providing a bush with different layers of composite and having an axis, which either are or are not fibre-reinforced, wherein the layers which are located near an outer perimeter of the bush have a greater elasticity than the layers located near an inner wall of the bush, wherein providing the bush includes making the bush of a fibre-reinforced composite with at least one of the following layers or a combination thereof:
      an inner layer whose fibres are wound in a direction extending between +/−70° and 90° in relation to the axis of the bush, wherein the inner layer is made with carbon fibre;
      an intermediate layer whose fibres are wound in a direction extending according to a direction between +/−70° and 90° in relation to the shaft;
      an axial layer whose fibres are wound in a direction extending according to a direction between 0 and +/−70° in relation to the shaft; and,
      an outer layer whose fibres are wound in a direction extending between +/−70° and 90° in relation to the shaft;
   providing a guide element on the extension of said part of the shaft, said guide element having an outer surface which is at least partly conical and whose largest diameter deviates maximally five percent from the outer diameter of said part of the shaft;
   positioning the guide element such that the largest diameter of the conical part is directed to said part of the shaft;
   pushing the bush over the guide element, on the side of the guide element with the smallest diameter, and to said part of the shaft;
   moving a press axially towards the conical part during a first step in sliding the bush over the guide element, wherein the press is provided with a bearing face on which the entire end face of the bush rests during the pressing;
   using a press element with an inner diameter which is equal to or larger than the outer diameter of said part of the shaft during another step in sliding the bush over the guide element; and
   partly or entirely removing the outer layer, the axial layer and/or the intermediate layer after the bush has been applied over the part of the shaft.

2. Method according to claim 1, wherein, during the said first step to axially slide the bush over the guide element, axially moving the press up to the conical part of the guide element.

3. The method according to claim 1, wherein the smallest diameter of the conical part is smaller than or just as large as the inner diameter of the bush; and
   wherein, the outer surface of the guide element of the bush has an initial contact surface between the bush and the guide element that has a rounded edge, said initial contact surface being configured to contact the bush when the bush is initially fitted over the guide element.

4. The method according to claim 3, wherein the radius of the rounded edge is located within a range of $10^{-10}$ times the smallest diameter of the conical part to $10^{-1}$ times the smallest diameter of the conical part.

5. Method according to claim 1, wherein the bush is made of a plastic.

6. The method according to claim 1, wherein an apical angle ($\alpha$) of the conical part of the guide element is selected to be smaller than or as large as $\alpha$, and wherein:

$$\alpha = k \cdot |\epsilon| \cdot D4 / (h \cdot (D1 - D4))$$

where:
   $\alpha$=the maximal apical angle of the conical part in °;
   $k$=a factor which is selected on the basis of the way in which the bush is made and the material out of which the bush is made, which factor is within a range of $10^{-6}$ to $10^{-2}$;
   $|\epsilon|$=the absolute value of the maximally possible elongation for the least elastic material component of the bush or the plasticity limit of the metal of the shaft if the shaft is made of metal;
   $h$=the thickness of the wall of the bush in m;
   $D4$=the inner diameter of the bush in m; and
   $D1$=the outer diameter of the part of the shaft in m.

7. Method according to claim 6, wherein the guide element comprises a number of successive conical parts over its longitudinal direction, wherein every conical part meets the formula of claim 6, whereby D1 is each time determined by the largest outer diameter of the conical part.

8. Method according to claim 1, wherein the shaft is stepped and the guide element is at least partly hollow, including centering the guide element on the shaft by providing it with its hollow part over a shaft part with a smaller diameter than the part of the shaft over which the bush is to be received.

9. Method according to claim 1, wherein the shaft is provided with a recess at a far end thereof and the guide element is provided with an axially protruding part which is complementary to the recess in the shaft, wherein the guide element is centred on the shaft by introducing it at least partly in the recess of the shaft with its axially protruding part.

10. Method according to claim 1, wherein the outer surface of the guide element is provided with a cylindrical part which connects to the conical part, on the side of this conical part with the smallest diameter.

11. Method according to claim 10, wherein the outer diameter of the cylindrical part of the guide element is smaller than or equal to the smallest diameter of the conical part.

12. Method according to claim 1, wherein, in order to push the bush over the guide element and on the part of the shaft, using a cylindrical press which is at least partly hollow.

13. Method according to claim 12, wherein the hollow press is provided with a recess having an inner diameter which corresponds practically to the diameter of the cylindrical part of the guide element, wherein the hollow press is moved over the cylindrical part of the guide element during the axial movement.

14. Method according to claim 12, wherein the hollow press is provided with an overhang which rests against an end face of the bush during the first step to facilitate axially shifting the bush over the guide element.

15. The method according to claim 14, wherein, in a following step, a second press is first provided between the press and the guide element, wherein the second press has a recess with an inner diameter which is larger than the inner diameter of the bush before the bush is fitted over the shaft.

16. Method according to claim 14, wherein several successive steps are used when axially sliding the bush over the guide element, wherein at least a second press with an ever increasing inner diameter is used in every subsequent step.

17. Method according to claim 1, wherein the guide element is an integral part of the shaft.

18. Method according to claim 1, wherein the part of the shaft on which the bush is to be mounted with a force fit has a cylindrical shape.

* * * * *